Dec. 11, 1951   J. W. COOK   2,578,288
TEST ADAPTER
Filed March 3, 1950

Inventor
James W. Cook
by Roberts, Cushman & Grover
Att'ys

Patented Dec. 11, 1951

2,578,288

UNITED STATES PATENT OFFICE 2,578,288

TEST ADAPTER

James W. Cook, Waltham, Mass.

Application March 3, 1950, Serial No. 147,485

4 Claims. (Cl. 200—51)

In the testing of electrical circuits including electronic discharge devices such as vacuum tubes it is often necessary to determine the current flowing to one or more of the tube electrodes as well as the potential between various electrodes and ground or between two electrodes as the case may be. The potentials are readily measured by touching one probe of the test leads of a voltmeter to the soldered lug of the tube socket corresponding to the electrode whose potential is to be determined with the other probe of the test leads touched to the chassis or the other soldered lug depending upon the potential measurement being made. To make a current measurement a milliammeter must be connected in series with the circuit to the electrode under test which is usually accomplished by unsoldering the corresponding lead from the socket lug and interposing the test probes of the meter leads between the lug and the lead. This procedure is time consuming and there is always the possibility that a connection will not be properly resoldered resulting in further trouble.

It is accordingly the principal object of this invention to provide a test adapter which permits the insertion of a meter in series with the various electrodes of a vacuum tube in a circuit under test without unsoldering or otherwise interfering with the normal connections of the circuit or tube.

Further objects are to provide a test adapter which can be readily used, which facilitates testing and decreases the testing time required, which is simple in design, which is strong and durable in construction, which is attractive in appearance, which is economical to manufacture, and which can be sold at a relatively low cost.

In a broad aspect the invention contemplates a test adapter comprising a male plug having pins arranged to engage the apertures in the socket in which the vacuum tube whose associated circuits are to be tested is normally inserted. The adapter also has a socket arranged to receive the pins of the vacuum tube so that the adapter can be interposed between the tube and its socket by inserting the adapter pins in such socket and the pins of the tube in the adapter socket. A connection extends from each pin of the adapter plug to a corresponding aperture in the adapter socket. Switching means are provided in one or more of the connections so that such connections can be selectively interrupted and a test meter inserted in series therewith.

In another aspect the socket and male plug are inserted respectively in recesses in the opposite ends of an elongated body, which is preferably substantially cylindrical in shape. A plurality of jacks adapted to receive the end of a probe of a test lead are secured in the end of the body about the outer periphery of the socket, each of the jacks being connected to a respective pin in the male plug by means of a conductor such as a wire which extends through the body. Each jack is also connected by a respective normally closed switch with the connecting member of a corresponding socket aperture thereby to complete an individual circuit between the plug pin and the conducting member in the corresponding socket aperture.

In another aspect the switch comprises an arm of conducting material extending laterally from a respective jack thereby to act as a stationary contact, and a movable contact of yieldable conducting material one end of which is soldered to the connecting member in the corresponding socket aperture so that the other end normally engages the stationary contact to complete the circuit between the plug pin and the corresponding socket member.

In a specific aspect the movable switch contact comprises a tab which is located in a circumferential groove in the outer periphery of the socket. Integrally joined to the tab is one end of an elongated portion of the contact, which tab lies in a slot in the outer periphery of the socket and extends from the groove to the bottom of the socket so that the opposite end of the elongated portion can be soldered or otherwise connected to the connecting socket member. The soldered end of the elongated portion is formed integrally with one end of a substantially parallel portion which is bent back so that it also lies in the slot. The other end of the parallel portion is joined with and bent at an acute angle to an outwardly extending portion. The movable contact is so deformed by the yieldable conducting material that the opposite end of the extending portion is urged against the stationary contact. Further objects relate to various features of construction and will be apparent from the consideration of the following description and accompanying drawing wherein:

Figure 1:
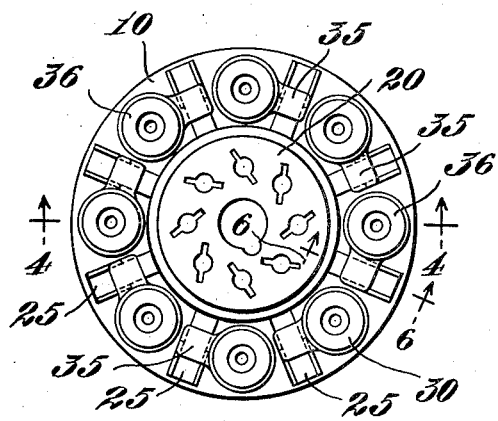
Fig. 1 is a plan view of the preferred embodiment of the adapter.
Figure 3:
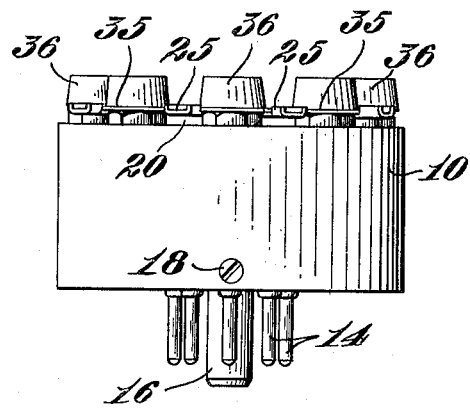
Fig. 3 is a side elevation view.
Figure 2:
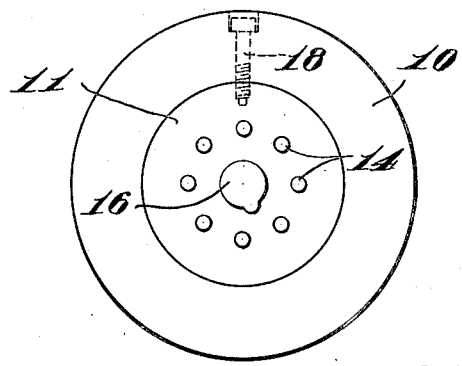
Fig. 2 is a bottom view of the same embodiment.
Figure 4:
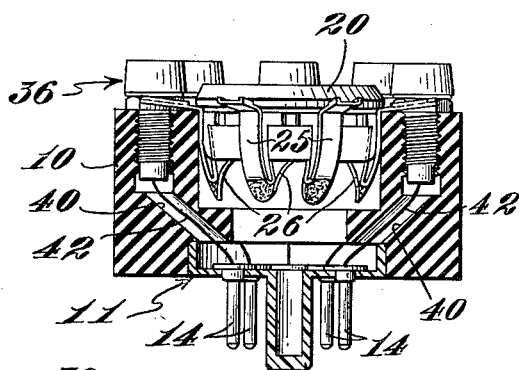
Fig. 4 is a plain view on line 4—4 of Fig. 1.

Referring to the figures, the test adapter illustrated comprises an elongated substantially cylindrical body 10 of an insulating material such as a suitable plastic. Molded or otherwise formed in the bottom of the body 10 is a recess wherein is inserted a male plug 11 (Fig. 4) having base pins 14 and an aligning plug 16 arranged in a similar configuration to that of a standard octal plug although it is to be understood that any type of plug may be used without departing from the spirit of the invention. The plug 11 is secured in the body recess by means of a screw 18 (Fig. 2) which projects through a clearance hole in the side of the body 10 to engage a threaded aperture in the side of the plug 11.

Figure 7:
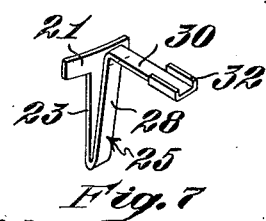
Fig. 7 is an isometric view of the movable switch element.
Figure 5:
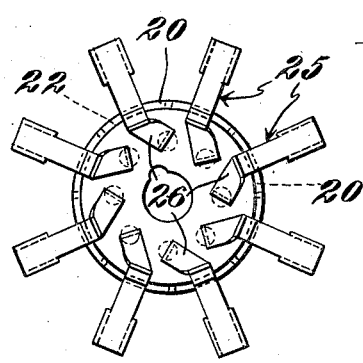
Fig. 5 is a bottom view of the socket removed from the body showing the details of the movable elements of the switch.
Figure 6:
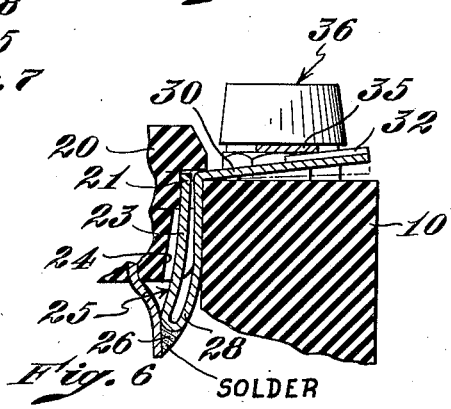
Fig. 6 is an enlarged fragmentary sectional view on line 6—6 of Fig. 1.

The top of the body 10 is also recessed to receive a standard socket 20 of the type corresponding to that of the plug 11. A circumferential groove is cut around the periphery of the socket 20 to accommodate supporting tabs 21 of movable switch elements 25 (Fig. 7). The tab 22 extends laterally from one end of an elongated portion 23 of the corresponding switch element 25 which elongated portion lies in a respective longitudinally arranged slot 24 (Fig. 6) in the outer periphery of the socket 20 so that the opposite end of the elongated portion which is bent back to form an essentially parallel portion 28 can be soldered or otherwise connected to an adjacent lug 26 extending from the socket and connecting with the connecting member in the socket aperture. Such soldered connection serves the dual purpose of providing additional support for the switch element 25 and electrically connecting element to the corresponding conducting member in the socket aperture. The upper end of the parallel portion 28 of the switch element 25 is bent at an acute angle of somewhat less than 90 degrees thereby to form an accliviously outwardly extending portion 30 at the end of which its opposing sides are turned upwardly to form two parallel lips 32 whose function will be described in detail hereinafter.

As the socket 20 is inserted in the recess in the top of the base 10, the parallel portions 28 of the switch elements 25 are forced back into their respective slots 24 so the lips 32 at the end of the outwardly extending portions 30 come into contact with the respective bottoms of the laterally extending arms 35 which act as stationary switch contacts.

The opposite end of each of the arms 35 has an aperture through which passes the threaded shank of a corresponding pin jack 36, the arm being secured between the insulating head of the jack and a locknut 28 which engages the shank threads. In the case, as above, where an octal socket 20 is used, eight pin jacks 36 are equally spaced about the socket, the threaded shank of each jack engaging threads tapped or otherwise formed in a respective recess extending downwardly from the top of the body 10.

A plurality of decliviously disposed apertures 40 (Fig. 4) extend from the bottom of each jack recess to the recess in the bottom of the body 10 wherein is secured the male plug 11 thereby to form passageways for conductors such as the wires 42 connecting each of the jacks 36 with a correlated pin 14 in the male plug 11. From the foregoing it will be apparent that a circuit is completed from each of the pins 14 through the connecting wire 42 to the corresponding jack 36, thence through the stationary switch contact arm 35 and the movable switch element 25 to the correlated connecting member in the socket aperture.

In using the above described test adapter the vacuum tube is removed from the socket (not shown) of the electronic apparatus being tested and the male plug 11 inserted in such apparatus socket. The removed vacuum tube is then inserted in the socket 20 of the test adapter, the circuits to the various tube electrodes being completed through the jacks 36 and the stationary and movable switch elements described heretofore so that the vacuum tube and associated equipment function normally. To determine the current flowing to any electrode of a vacuum tube under test, the probe at the end of one of the test leads to a milliammeter is inserted in the pin jack 36 corresponding to such tube electrode. The other test probe is touched to the outwardly extending portion 30 of the movable switch element 25 and the switch element depressed thereby breaking the electrical contact between the stationary arm 35 and the movable switch element 25. The lips 32 help prevent the probe from slipping from the outwardly extending member 30 as it is depressed. It will be apparent that such action of the probes breaks the circuit through the switch to the tube electrode and concomitantly completes a second series circuit through the milliammeter. Potentials between various tube electrodes can be easily measured by either inserting the probes leading to a voltmeter in the respective jacks or touching such probes to the corresponding switch elements without opening the switches. Potentials to ground can similarly be obtained connecting the probes between the respective jack or switch element and the chassis.

It should be understood that the present disclosure is for the purpose of illustration only and that this invention includes all modifications and equivalents which fall within the scope of the appended claims.

I claim:

1. A test adapter comprising an elongated body having aligned recesses in the respective ends thereof, a male plug of the type having pins arranged similarly to those of a vacuum tube inserted in one of said body recesses, a socket inserted in the other recess, said socket being of the type having a plurality of apertures wherein are connecting members arranged to receive the pins of a vacuum tube, a plurality of pin jacks secured in the end of said body about said socket, a plurality of conductors each extending through said body between one of the pins of the male plug and a respective jack, and a plurality of normally closed switches each connecting one of said jacks with a member in said corresponding aperture of the socket to complete an individual circuit between the plug pin and the member in said corresponding aperture whereby a test meter can be selectively inserted in series with the respective circuits between the jacks and the corresponding portions of the switches connected to the members in said socket apertures.

2. A test adapter comprising an elongated body having aligned recesses in the respective ends thereof, a male plug of the type having pins arranged similarly to those of a vacuum tube inserted in one of said body recesses, a socket inserted in the other recess, said socket being of the type having a plurality of apertures wherein are connecting members arranged to receive the pins of a vacuum tube inserted in the other recess, a plurality of pin jacks secured in the end of said body about said socket, a plurality of conductors each extending through said body between one of the pins of the male plug and a respective jack, and a plurality of normally closed switches, each having a stationary contact connected to one of said jacks and a movable contact connecting with a member in said corresponding aperture of the socket to complete an individual circuit between the plug pin and the member in said corresponding aperture whereby a test meter can be selectively inserted in series with the respective circuits between the jacks and the corresponding movable contacts of the switches connected to the members in said socket apertures.

3. A test adapter comprising an elongated body having aligned recesses in the respective ends thereof, a male plug of the type having pins arranged similarly to those of a vacuum tube inserted in one of said body recesses, a socket inserted in the other recess, said socket being of the type having a plurality of apertures wherein are connecting members arranged to receive the pins of a vacuum tube inserted in the other recess, a plurality of pin jacks secured in the end of said body about said socket, a plurality of conductors each extending through said body between one of the pins of the male plug and a respective jack, and a plurality of normally closed switches each having a conducting arm connecting with and extending laterally from a respective jack which acts as a stationary contact and a yieldable member having one end soldered to the member in the corresponding aperture and arranged so that the other end is urged against the arm thereby to act as a movable contact thereby to complete an individual circuit between the plug pin and the member in said corresponding aperture whereby a test meter can be selectively inserted in series with the respective circuits between the jacks and the corresponding yieldable members of the switches.

4. A test adapter comprising an elongated, substantially cylindrical body having aligned recesses in the respective ends thereof, a male plug of the type having pins arranged similarly to those of a vacuum tube inserted in one of said body recesses, a socket inserted in the other recess, said socket being of the type having a plurality of apertures wherein are connecting members arranged to receive the pins of a vacuum tube, said socket having a circumferential groove and a plurality of longitudinal slots in the outer periphery thereof extending from the groove to one end of the socket, a plurality of pin jacks secured in the end of said body about said socket, a plurality of conductors each extending through said body between one of the pins of the male plug and a respective jack, and a plurality of normally closed switches, each having a stationary contact connected to one of said jacks and a movable contact including a tab located in said circumferential socket groove, an elongated portion integrally connected at one end to said top and lying in a respective slot with its opposite end soldered to a member in a corresponding aperture, a substantially parallel portion integrally joined at one end with the soldered end of the elongated portion and bent back at the joined end thereof so that the parallel portion also lies in the slot and an outwardly extending portion joined with and cut at an acute angle to the opposite end of the parallel portion, said movable contact being of conducting yieldable material so that it is urged against the stationary contact thereby to complete an individual circuit between the plug pin and the member in said corresponding aperture whereby a test meter can be selectively inserted in series with the respective circuits between the jacks and the corresponding movable members of the switches.

JAMES W. COOK.

REFERENCES CITED

The following references are of record in the file of this patent:

UNITED STATES PATENTS

| Number | Name | Date |
|---|---|---|
| 490,605 | Vetter | Jan. 24, 1893 |
| 1,535,261 | Simmons | Apr. 28, 1925 |
| 2,088,355 | Wehming | July 27, 1937 |